United States Patent [19]

Moore

[11] 3,747,219

[45] July 24, 1973

[54] GAUGING SYSTEM
[75] Inventor: Robert R. Moore, Golden, Colo.
[73] Assignee: The United States of America as represented by the United States Atomic Energy Commission, Washington, D.C.
[22] Filed: Jan. 18, 1971
[21] Appl. No.: 107,389

[52] U.S. Cl. ............................. 33/174 L, 33/174 Q
[51] Int. Cl. ............................................. B23f 23/08
[58] Field of Search ..................... 33/174 Q, 174 L, 33/174 TB, 174 TC, 174 P

[56] References Cited
UNITED STATES PATENTS
2,843,939  7/1958  Aller ................................. 33/174 Q
3,582,211  6/1971  McClure ............................ 356/138

Primary Examiner—William D. Martin, Jr.
Assistant Examiner—Dennis A. Dearing
Attorney—Roland A. Anderson

[57] ABSTRACT

A gauging system comprising a first rotatable table, a second rotatable table mounted for rotation about an angle of 45° with respect to a rotational axis of said first table, with means for rotating the respective tables, means for mounting an object to be gauged on said second table, and indicating means for sensing variation in wall positions of said object from a central axis or point.

9 Claims, 9 Drawing Figures

INVENTOR.
BY ROBERT R. MOORE

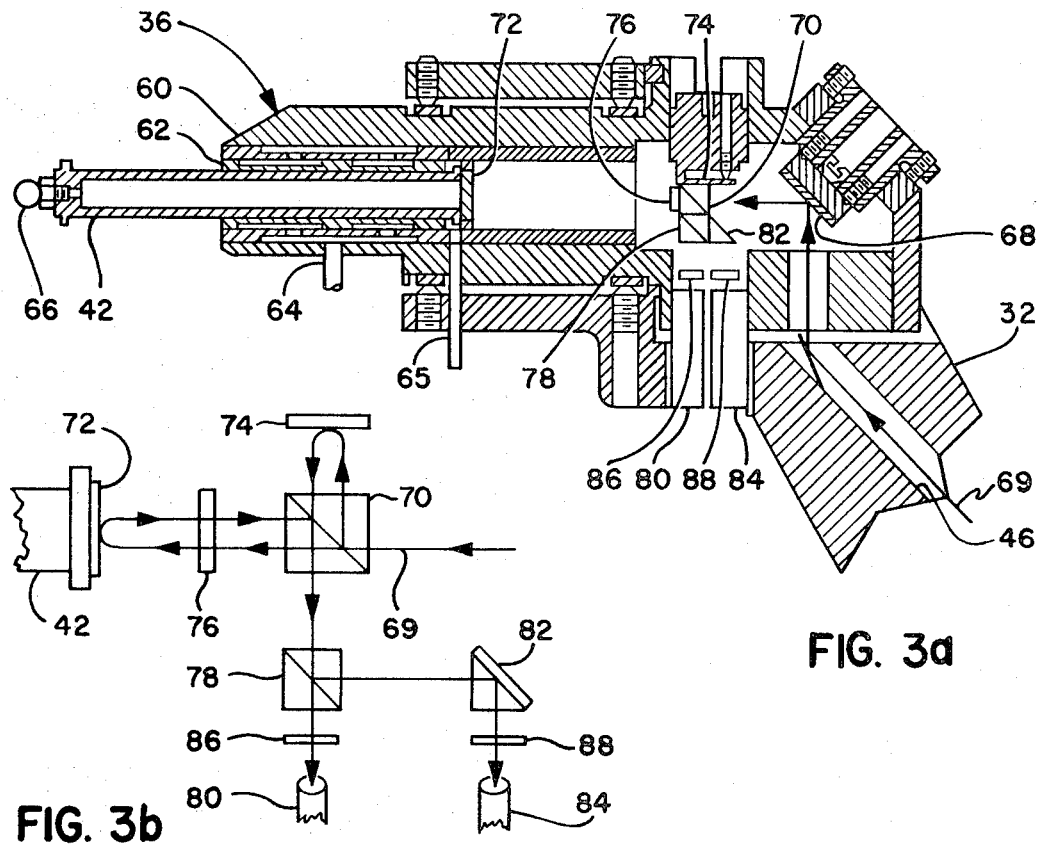

INVENTOR.
ROBERT R. MOORE

GAUGING SYSTEM

BACKGROUND OF INVENTION

Modern technology places increasingly greater demands on accuracy in machining or otherwise forming of objects, parts or the like aparatus. In order to verify the accuracy of the particular apparatus so formed, precision gauging systems must be developed which are commensurate with desired small tolerances. Such gauges or indicators must be able to determine or measure radial distance or surface accuracy as well as, in some cases, measure wall thicknesses within the same tolerances.

It is desirable in many of these applications that the gauging system be one which may be operated automatically or at least by remote control to insure repetitive gauging accuracies. In providing such automatic gauging equipment, the equipment may utilize moving parts, including bearings and such, which may normally limit the gauging accuracy or capabilities due to inherent inaccuracies in the moving parts. Such may be particularly true of such bearing systems as trunnion bearings or of cantilever arms. Also, such bearings may be required to rotate a relatively heavy or large apparatus over some angle of movement and thus place additional strain on machine elements, which may result in further limitations on gauge accuracy.

Many apparatus to be gauged are, or have portions that are, symmetrical or almost symmetrical about a center point with either a constant or varying radius of curvature about that point; some such apparatus may include both an inside and outside surface each having its own radius of curvature, for example a hemispherical, generally hemispherical or ovate body or shell. It would be desirable in gauging such apparatus that the equipment be capable of measuring the apparatus radial distance along many different and possibly, widely varying and continuous paths to insure complete assessment of the apparatus being tested.

SUMMARY OF INVENTION

In view of the above, it is an object of this invention to provide an improved gauging or indicative system which utilizes inherently precise bearing arrangements and readily reproduced movements;

It is a further object of this invention to provide a gauging system which may provide highly accurate gauging of radial distances or measuring of wall thicknesses of generally arcuate, ovate, or hemispherically shaped apparatus;

It is a further object of this invention to provide a gauging apparatus in which the gauge heads or head may be fixed in position.

Various other objects and advantages will appear from the following description of the invention, and the most novel features will be particularly pointed out hereinafter in connection with the various claims. It will be understood that various changes in the details, materials and arrangement of parts, which are herein described and illustrated in order to explain the nature of the invention, may be made by those skilled in the art.

The invention comprises a gauging system comprising a first rotatable table, a second rotatable table, which may be mounted on said first table, rotatable about an axis at an angle of about 45° with respect to rotational axis of the first table, means for rotating the first table about a first axis, means for rotating the second table about a second axis at said 45° angle with respect to said first axis, means for mounting an object to be gauged on the second table, with what may be termed a central point thereof at the intersection of said first and second axes, and means for determining the accuracy of a radial distance of the object that may be disposed along a radius extending from said point at the intersection of said axes.

DESCRIPTION OF DRAWING

The invention is illustrated in the accompanying drawing wherein:

FIG. 3a is a cross-sectional side view of a gauging head and optic measuring system associated therewith for the system of FIG. 1;

FIG. 3b is an expanded diagrammatic view of the optical arrangement shown in FIG. 3a;

FIG. 4 is a cross-sectional view of a bearing arrangement for support and rotation of one of the annular tables of FIG. 1;

DETAILED DESCRIPTION

Figure 1:
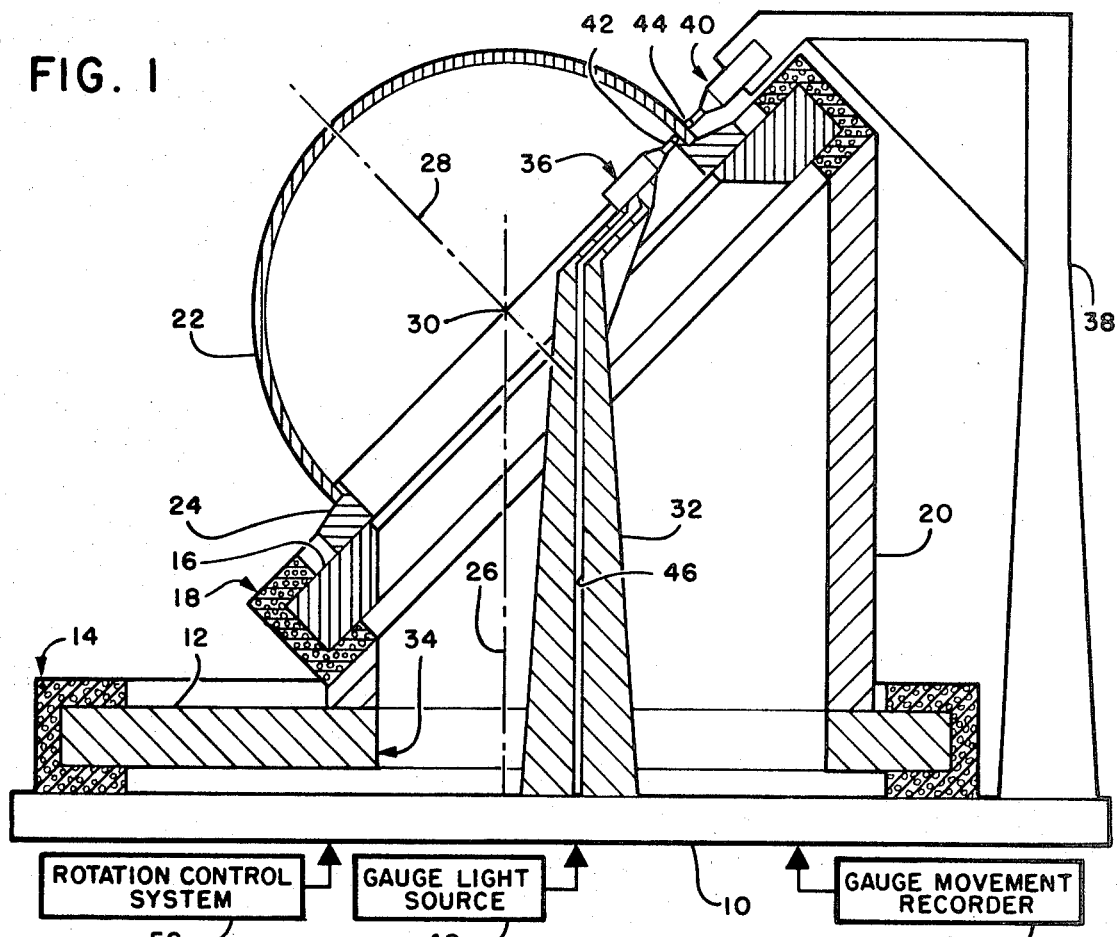
FIG. 1 is a simplified elevation side view, partially in cross section, of a gauging system incorporating features of this invention.

Parts or objects or other apparatus, which include one or more surfaces defined by radii extending from a generally central point on a plane of the apparatus, where the radii extending from this same point at all angles between 0 and 90° with respect to the plane and at all angles of rotation do not vary more than the maximum displacement of gauge stylii, may be measured with the gauge system shown in FIG. 1. The plane containing the central point is positioned generally at the "equator" of the apparatus with the "pole" thereof generally at 90° with respect to the plane and point. The simplest object shape fitting within this definition is that of a hemisphere or a hemispherical shell. For purpose of illustration of the operation of the gauging system of this invention, the system will be shown gauging a hemispherical shell though it will be understood that generally ovate or other like shapes and configurations may be gauged by proper positioning thereof with respect to the gauging apparatus and gauge heads.

Referring to FIG. 1, the gauge system of this invention may be mounted on an appropriately rigid base 10 which provides the necessary support for the gauge system and object being gauged as well as provide or support any desired electrical, optical or other conduits for operation of the respective gauge system equipment. The various parts of the gauge system, including base 10, are shown in simplified forms for purpose of illustration. It will be understood that the respective apparatus of the gauge system may be made of whatever material and of whatever design and configuration which will provide the desired operating characteristics of the system, portions of which are described in greater detail in FIGS. 3–6.

A table 12 may be of annular configuration appropriately mounted on base 10 by a bearing arrangement 14. Bearing arrangement 14 may be any combination of bearings or bearing surfaces which will permit rotation of table 12 in a single plane with great accuracy. A particularly appropriate bearing arrangement is the hydrostatic bearings shown in FIGS. 4 and 6 and described in detail below. A second annular table 16 is shown rotatably mounted by a second and possibly similar bearing arrangement 18 and by an annular mounting bracket 20 on table 12 with a supporting surface at an angle of 45° with respect thereto. With this configuration, as table 12 is rotated, table 16 will always be at the same, 45° angle with respect thereto. An object or part 22, shown as a hemhemispherical shell, may be appropriately mounted by suitable brackets, fasteners or the like on an annular support 24 or directly on table 16, as desired.

Table 12 may thus be rotated about an axis designated by center line 26 while table 16 may be rotated about an axis designated by center line 28 as determined by the bearing arrangements 14 and 18. In order to provide complete measurement of object 22, a "center point" of the object designated as point 30 (which is also the center of the hemisphere shown) is preferably positioned at the intersection of axes 26 and 28. The plane of the base of the object being gauged, or any appropriate plane including the center point, is preferably positioned parallel to the plane of rotation of table 16 and passing through the intersection of axes 26 and 28. With the hemispherical shell shown, this plane passes through the equator of object 22. Such an arrangement will insure the complete gauging of all radii at any desired point on the surfaces of object 22 so long as radii extending from center point 30 do not vary more than the maximum displacement of gauge stylii.

A gauge head support arm 32 may be mounted within an opening 34 in table 12 at a position which will insure the free movement and rotation of table 12 while positioning a gauging head 36 in a desired position and attitude with respect to the gauging system and object 22 to be gauged. A similar gauge head support arm or member 38 may also be mounted on base 10 but outside table 12 and bearing arrangement 14 to position a similar or identical gauging head 40 at the exterior of object 22. Gauging heads 36 and 40 are preferably positioned along a radius of object 22 with their respective gauge stylii 42 and 44 and gauge stylii movement aligned therewith. With table 12 and table 16 in the position shown in FIG. 1, gauge stylii 42 and 44 should also be positioned on the base plane of object 22 adjacent to the equator of object 22. The gauging system may be used also with one or the other of gauging heads 36 or 40 depending on the surfaces being measured.

Provision may be made to provide some adjustment of the position of annular support 20 on table 12 transversely with respect to axis 26 and adjustment of support 24 and/or table 16 transversely and longitudinally with respect to axis 28 to insure that the axes 26 and 28 and the plane of the object intersect at a center point of object 22 and that the plane of object 22 is at the proper attitude. Such may be accomplished by moving the respective parts in appropriate directions to move the respective axes and plane positions by suitable slides, brackets and fasteners.

Gauging heads 36 and 40 may be any appropriate gauging means which provides an electrical or the like indication of changes in radius of the surfaces of object 22. In order to provide the desired high accuracy for this gauging system, it is preferred that the gauging apparatus utilize an optical interferometric gauging system as described more fully in FIGS. 3a and 3b below. An optical path may be provided to the gauging heads 36 and 40 by optical channels or passageways through supporting arms 32 and 38, such as by channel 46 in arm 32, which may be coupled to an appropriate source of light 48, such as a laser light source. Light beams from light source 48 may be conveyed by appropriate optical channels or optic systems via base 10 or any other means to the respective channels in arms 32 and 38. Arms 32 and 38 may also be used to support appropriate electrical cables or conductors from gauging heads 36 and 40 to a gauge movement recording system 50 which records the movement of gauge stylii 42 and 44 with counter circuits, mechanisms or the like. The data recorded by such counters may provide an indication of the accuracy of the radial distance of object 22 and/or the wall thickness thereof.

Figure 2A:
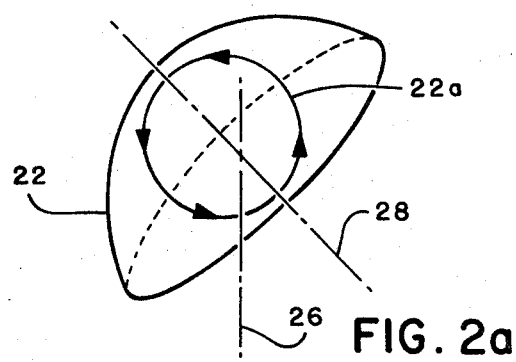
FIGS. 2a, 2b and 2c, are diagrammatic perspective views showing representative scans produced by the apparatus and system of FIG. 1 on a hemispherical object.
Figure 2B:
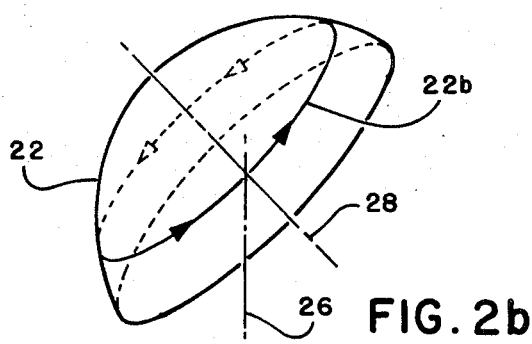
Figure 2C:
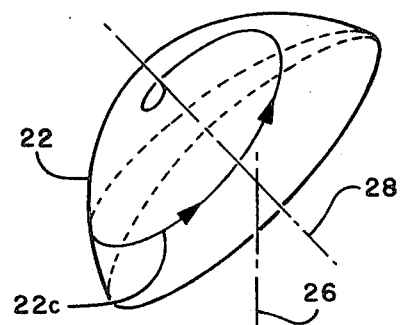

Tables 12 and 16 may be rotated by appropriate motor driven gear or belt drive systems in a manner well known in the art by a suitable rotation control system 52 which may selectively rotate one or the other or both of the tables, rotate the tables at the same rotation speed and/or rotate them at the same or different combinations of speed rotations. If table 12 is rotated 360° about axis 26 while table 16 is maintained stationary, gauge stylii 42 and 44 will traverse a circular path from the initial position shown in FIG. 1 at the equator of object 22 to the pole of object 22 back to the initial position in the manner illustrated by the arrow path 22a in FIG. 2a. If table 16 is rotated 360° about axis 28 while maintaining table 12 stationary, gauge stylii 42 and 44 will traverse a circular path from the initial position shown at the equator of object 22 about the equator thereof back to the initial position as illustrated by the arrow path 22b in FIG. 2b. If one or the other of the tables is stepped from one position to the other and the other table rotated through 360° of revolution for each of the stepped positions, the entire surface of object 22 may thus be gauged, the closeness of the respective traverses being determined by the step rotations of the stationary table. If both tables are rotated simultaneously, a spiral path traverse may be provided. For example, if table 16 is rotated through two complete revolutions while table 12 is rotated 180°, a two spiral path from the initial position shown at the equator of object 22 to the pole thereof will be produced as illustrated by path 22c in FIG. 2c. Thus, widely varying paths may be produced with the gauging system shown in FIG. 1 providing as complete coverage of the surfaces to be gauged as desired with a combination of rotations of the gauge support tables in their respective bearing arrangements at any desired combination of rotation speeds, single table rotation or single table rotation together with stepping of the other table. The accuracy of the system is limited only by the sensitivity of the gauging heads and the accuracy of the bearing arrangements 14 and 18. Since the rotations of the tables 12 and 16 are on a single plane, extremely high accuracy may be achieved with the bearings.

The gauging system has been illustrated with table 16 positioned at an angle of 45° with respect to table 12. If the object to be gauged requires it, other angles than 45° may be utilized in order that all portions of the surfaces may be covered.

The gauging heads 36 and 40 and the gauge stylii 42 and 44 may be the same or similar apparatus constructed in the manner of the gauging head 36 illustrated in FIG. 3a. Gauge stylus 42 may be appropriately mounted in a housing 60 and supported for freedom of longitudinal movement by annular, porous carbon bearing pad 62 and pressurized air introduced at the outer surface of pad 62 via tube 64; any other suitable type of such bearing may be employed, e.g., steel or other metal with appropriate air conducting grooves or passageways. Gauging stylus 42 thus "floats" within the bearing pads to provide low friction movement thereof. The bearing pads may be provided with appropriate internal and external longitudinal and circumferential grooves to provide ready movement of air through or around the porous or other appropriate bearing pad and about stylii 42. A feeler gauging ball 66 or the like may be fixed to the outer end of gauging stylus 42 to act as the gauge-contacting element to the object to be measured. With this stylus and bearing arrangement, the maximum travel of the stylus is determined by the length of the bearing pad and the length of the stylus 42. Alignment and positioning of gauge stylus 42 may be achieved by appropriate adjustment of aligning screws shown, and the like.

The measurement or indication of the longitudinal position of gauge stylus 42 may be provided by an optical system, shown in greater detail in FIG. 3b, which reflects the light supplied by light source 48 (shown as light beam 69) through channel 46 of arm 32 through an appropriate interferometric system positioned within a chamber of gauging head 36. The light beam may be reflected by an adjustable mirror 68 through a beam splitter 70. Beam splitter 70 divides the beam into two paths, one path of which is reflected against a mirror 72 fixed to an end of gauging stylus 42 disposed opposite to feeler ball 66 within gauging head 36 and another path which is reflected against an adjustable mirror 74. The light beam which is reflected from mirror 72 is also passed through a one-eighth wave-retardation plate 76. The light beam reflected from mirror 72 of gauging stylus 42, after being retarded by retardation plate 76, is recombined in beam splitter 70 and interfered with the light beam reflected from mirror 74 to form interference fringes which are then conveyed by beam splitter 70 to another beam splitter 78. The combined interfering beams are divided by beam splitter 78, one fringe beam continuing through beam splitter 78 against a photodetector 80 with the other fringe beam being reflected by mirror or prism 82 against a second photodetector 84. Before entry of the respective fringe beams into photodetectors 80 and 84, the beams may be passed through linear polarizers 86 and 88 which are positioned optically at 90° with respect to each other. The outputs of photodetectors 80 and 84 may then be conveyed to gauge movement recorder 50.

In order to insure stable fringes within the optical system, it may be necessary to prevent or minimize rotation of gauging stylus 42 due to possible inaccuracies in positioning of mirror 72. Such may be achieved by machining a flat on one side of gauging stylus 42 and providing an air impervious key in a corresponding position on annular bearing pad 62. Even with a typical 1.5 inch gauge stylus travel, good stability may still be achieved. Appropriate pressure may be applied to feeler ball 66 by providing either a positive or negative air pressure at the opposite end of gauging stylus 42 via tube 65 to insure constant feeler contact with a surface of object 22 during operation of the gauging system and to remove the gauging stylus from contact therewith when a new object is being positioned on the gauging system.

Using linearly polarized laser light from light source 48, the system shown will provide accurate measurement of the movement of the gauging stylus as well as indicating the direction of gauging stylus movement. The reference portion of the laser light beam reflected by beam splitter 70 against mirror 74 and back thereto remains linearly polarized. The transmitted portion which passes through the one-eighth wave-retardation plate 76 becomes eliptically polarized and after reflection from stylus mirror 72 and return passage through one-eighth wave-retardation plate 76 becomes fully circularly polarized. The circularly polarized beam then recombines with the linearly polarized reference beam from mirror 74. The combined beam, containing a fringe pattern, is then divided by the fringe-pattern beam splitter 78 and the respective portions sent through separate polarizing elements 86 and 88 to photodetectors 80 and 84. It is generally preferable that the detectors and optical system be adjusted so that each detector views only one fringe at a time.

Gauge movement recorder circuit 50 may include appropriate counting and logic circuitry to determine the direction of motion of the gauging stylus while recording the cumulative total of gauge stylus movement. For example, if a particular fringe passes over detector 80 before detector 84, corresponding to an extension of gauging stylus 42, the fringe counter may subtract a count while if it passes over detector 84 before detector 80, the counter may add a count. The detector signals may be adjusted for quadrature so that each quarter-fringe movement of the stylus produces a logic transition in one or another of the counters. The system may thus be capable of measuring a displacement as low as one-fourth or one-half wavelength. Depending upon the laser light source used, such may be translated to an appropriate distance, for example $3 \times 10^{-6}$ inches for a helium-neon laser light source. Since the wavelength of light depends to a certain extent on the index of refraction which in turn depends on the temperature, pressure and water vapor content of air, to insure high gauge accuracy the system should be used in an environmentally controlled area or an appropriate adjustment of the counters should be provided.

A bearing arrangement and rotation system is shown in FIG. 4 which may be utilized for bearing arrangements 14 and 18. The bearing arrangement (identified as bearing arrangement 18) utilizes three annular porous graphite bearing pads 90, 92 and 94 supported within bearing brackets 96, 98 and 100. Pressurized air is provided at the outer face of the porous bearing pads 90, 92 and 94 via channel 102 and grooves 104 in bearing supports 96, 98 and 100. Bearing pad 92 is preferably made with a generally trapezoidal cross section configured to mate with a beveled or pitched outer bearing surface 93 of table 16 to provide axial and radial stability of tables 12 and 16. Pressurized air may be appropriately supplied (not shown) to bearing arrangements 14 and 18, as well as to gauging heads 36 and 40, in any convenient manner. The flow of air through the channels and grooves and bearing pads thus provides hydrostatic support of table 16. Such a hydrostatic bearing may be made with extreme accuracy to provide planar rotation of table 16 with almost undetectable inaccuracies. Any wear to bearing surfaces will be extremely small and inherently even. Table 16 may be caused to rotate by an appropriate motor 106 supported by bracket 20 or bearing bracket 100 and controlled by system 52. Motor 106 may drive table 16 by appropriate annular rack or ring gear 108 disposed about table 16 with a pinion or spur gear 110 coupled to the shaft of motor 106. As described above, motor 106 may be operated in a continuous manner with various speeds and directions of rotations and/or by stepped movement.

Figure 5:
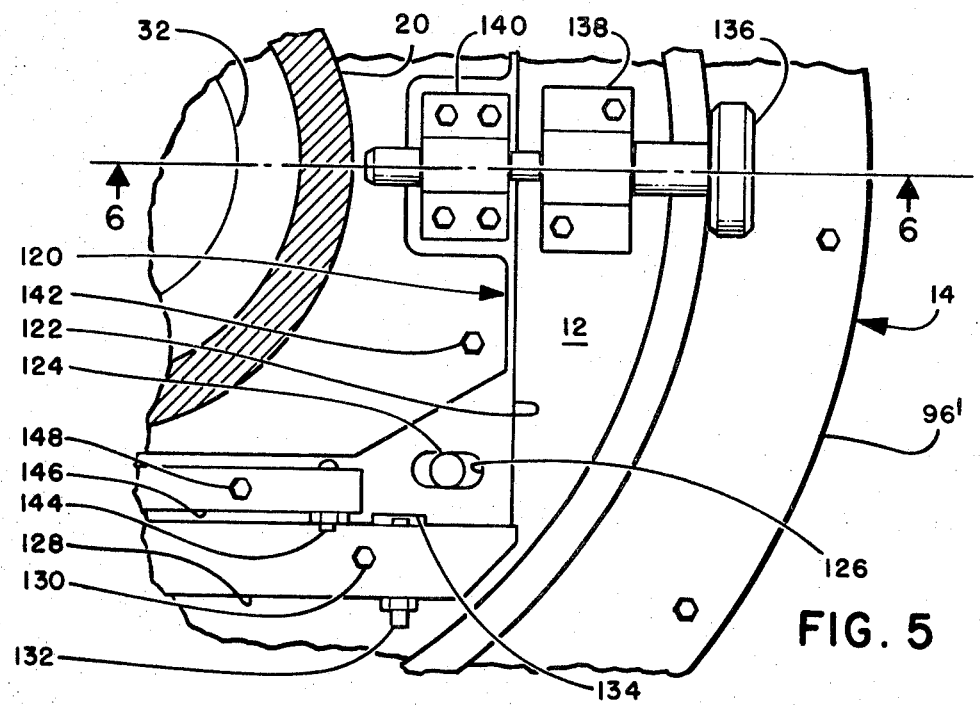
FIG. 5 is a fragmentary top view of a portion of a support system which may be used for tables 12 and 16.
Figure 6:
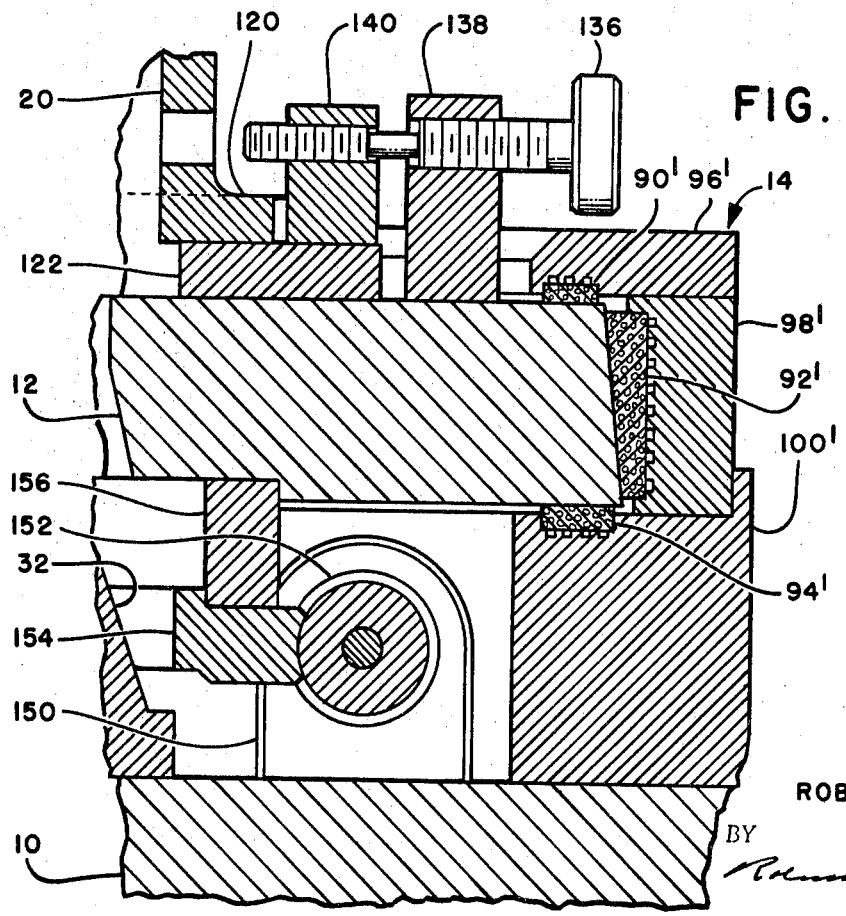
FIG. 6 is a cross-sectional fragmentary side view of the support system of FIG. 5 taken along lines 6—6 thereof.

Positioning or adjustment of the tables 12 and 16 to provide the desired rotation axes relationship may be achieved with the adjustable support system arrangement shown in FIGS. 5 and 6. With this arrangement, annular mounting bracket 20 is movably supported on table 12 using a foot or extension 120 suitably attached to a movable plate 122. As only one corner end of the positioning arrangement is shown it will be understood that similar fasteners and slidable members may be arranged about annular mounting bracket 20 and table 12 to provide the desired adjustments thereof.

Plate 122 is held against table 12 by a plurality of bolts 124 threaded or fastened thereto and disposed within elongated slots 126 passing through plate 122. Bolts 124 include appropriate nut and washer means (not shown) which may be suitably tightened or loosened against plate 122 to permit movement and fixation thereof. Plate 122 is positioned between a pair of slides 128 (only one shown as noted above) located along opposite edges of plate 122. Slides 128 are fastened by appropriate bolts, such as bolt 130, to table 12 and carry an adjustable locking screw 132 or screws which cooperate with a corresponding groove 134 along the edge of plate 122 to permit movement thereof and to aid in fixing the same in position. It will be apparent that grooves 134 and slots 126 should be dimensioned of corresponding lengths. Plate 122 may be moved between slides 128 along slots 126 and grooves 134 by a wheel and threaded bolt arrangement 136 which is threaded through a mounting bracket 138 attached to table 12 and a corresponding mounting bracket 140 fastened to plate 122. As the wheel and threaded bolt 136 is turned in one direction or another, when bolts 124 and locking screws 132 are in a loosened condition, plate 122 may be moved or slid between slides 128.

The foot or extension 120 of annular mounting bracket 20 may be fastened with suitable bolts, such as bolt 142, threaded or otherwise fastened to plate 122 through appropriate slots (not shown) in foot 120 similar to slots 126 to provide adjustment of bracket 20 transverse to the direction of adjustment of plate 122. Such may be achieved by loosening bolts 142 and adjusting locking screw 144 in a bar 146 fastened to plate 122 by appropriate bolts 148. Once the desired positioning of the table 12 and table 16 axes is achieved, bolts 124 and 142 may be suitably tightened along with locking screws 132 and 144.

The bearing arrangement 14 shown in FIG. 6 is similar to that shown and described with respect to FIG. 4. The bearing arrangement 14 utilizes the same or similar annular porous graphite bearing pads 90', 92' and 94' supported within appropriate bearing brackets 96', 98' and 100'. Table 12 may be supported by the porous bearing pads with appropriately applied pressurized air through the grooves shown. Table 12 may be rotated in the same manner as table 16 in FIG. 4 or by an appropriate motor 150 driven worm gear 152 coupled to an annular rack gear 154 appropriately supported below table 12 by an annular member 156.

What is claimed is:

1. Apparatus for gauging generally arcuate wall portions of an object comprising a first table having an axis of rotation perpendicular to a plane of said table; means for rotatably supporting said first table for rotation about said axis; a second table having an axis of rotation perpendicular to a plane of said second table; means for rotatably supporting said second table on said first table for rotation of said second table about its said axis disposed at an angle of about 45° to said axis of said first table; means for supporting said object on said second table for rotation therewith about said axis of said second table and about said axis of said first table; indicating means adjacent said object for determining variations in wall portions thereof; means for selectively rotating said tables to move said object past said indicating means whereby said determining occurs concurrrently with rotation of said first table and of said second table.

2. The apparatus of claim 1 wherein said second table is of generally annular configuration.

3. The apparatus of claim 2 wherein said object is hollow and therefor. wherein said indicating means includes a supporting arm projecting through said annular second table with an end portion adjacent an inner surface of said object and a supporting member with an end portion disposed adjacent an outer surface of said object in alignment with said end portion of said supporting arm through a wall portion of said object.

4. The apparatus of claim 3 wherein said object is of generally hemispherical shape and wherein said supporting arm and said supporting member of said indicating means are positioned adjacnet an equator of said object at one position of said second table and adjacent a pole of said object at another position of said second table.

5. The apparatus of claim 4 wherein each of said end portions of said supporting arm and of said supporting member include a stylus movable back and forth along a common axis to follow said inner and outer surfaces of said object as said object rotates with said tables.

6. The apparatus of claim 5 including an interferometric system, means for optically coupling said stylus to said interferometric system for producing interference fringes and means for sensing movement of said fringes in response to movement of said stylus.

7. The apparatus of claim 6 wherein said indicating means includes means for rigidly mounting said supporting arm and said supporting member.

8. The apparatus of claim 7 wherein said object supporting means includes means for positioning an object with a central point and the plane of its equator at the intersection of said table axes with said plane parallel to the plane of rotation of said second table, said stylii of said indicating means being positioned by said rigid mounting means for movement along a radius of said object.

9. The apparatus of claim 8 wherein said rotation supporting means for said first and said second tables includes a hydrostatic bearing for support thereof.

* * * * *